US005194692A

United States Patent [19]

Gallusser et al.

[11] Patent Number: 5,194,692

[45] Date of Patent: Mar. 16, 1993

[54] UNCASED DATA BUS COUPLER

[75] Inventors: David O. Gallusser, Oneonta; James B. LeBaron, Sidney, both of N.Y.

[73] Assignee: Amphenol Corporation, Wallingford, Conn.

[21] Appl. No.: 898,178

[22] Filed: Jun. 12, 1992

Related U.S. Application Data

[63] Continuation of Ser. No. 588,728, Sep. 27, 1990, abandoned.

[51] Int. Cl.[5] ........................ H01B 7/34; H02G 15/18

[52] U.S. Cl. ........................................ 174/36; 29/855; 156/48; 156/49; 174/35 C; 174/71 R; 174/88 C

[58] Field of Search ..................... 174/35 C, 36, 71 R, 174/72 R, 88 R, 88 C, DIG. 8; 333/24 R, 112, 119; 156/48, 49; 29/854, 855

[56] References Cited

U.S. PATENT DOCUMENTS

| | | | |
|---|---|---|---|
| 2,590,821 | 3/1952 | Kiser | 361/398 |
| 3,093,448 | 6/1963 | Kirkpatrick et al. | 264/272.11 |
| 3,484,532 | 12/1969 | Anderson | 174/36 |
| 3,601,783 | 8/1971 | Loose | 439/730 |
| 3,845,552 | 11/1974 | Waltz | 29/855 |
| 3,851,296 | 11/1974 | Muchmore et al. | 439/88 |
| 3,889,047 | 6/1975 | Carver | 174/84 R |
| 3,963,295 | 6/1976 | Askman et al. | 439/276 |
| 4,195,106 | 3/1980 | Brusselmans | 174/84 R X |
| 4,236,779 | 12/1980 | Tang | 439/610 |
| 4,237,609 | 12/1980 | Clabburn | 29/859 |
| 4,450,318 | 5/1984 | Scardina et al. | 174/84 R |
| 4,481,380 | 11/1984 | Wood et al. | 29/855 X |
| 4,500,371 | 2/1985 | De Groot | 174/DIG. 8 X |
| 4,549,039 | 10/1985 | Charlebois et al. | 174/72 R |
| 4,586,970 | 3/1986 | Ishise et al. | 174/84 R X |
| 4,589,939 | 5/1986 | Mohebban et al. | 156/49 |
| 4,684,762 | 4/1987 | Gladfelter | 174/36 |
| 4,707,200 | 11/1987 | Giebel et al. | 156/48 |
| 4,714,438 | 12/1987 | Williams | 439/610 |
| 4,731,500 | 3/1988 | Otsuka | 174/36 |
| 4,749,822 | 6/1988 | Klein | 174/36 |
| 4,814,028 | 3/1989 | Sawaki et al. | 156/49 X |

FOREIGN PATENT DOCUMENTS

| | | |
|---|---|---|
| B69712/87 | 9/1987 | Australia . |
| 0063913 | 11/1982 | European Pat. Off. . |
| 0136154 | 4/1985 | European Pat. Off. . |
| 1278171 | 6/1972 | United Kingdom . |

*Primary Examiner*—Morris H. Nimmo
*Attorney, Agent, or Firm*—Bacon & Thomas

[57] ABSTRACT

A cable coupling, particularly for data buses, includes a transformer and resistors to which the cables are directly wired. The components and all electrical connections are enclosed in a heat shrinkable tubing or sleeve filled with liquid encapsulant. Upon application of heat, the tubing shrinks causing the encapsulant to fill all voids between components. The encapsulant is then cured to provide an uncased coupling assembly which protects the components and electrical connections from breakage, while eliminating the need for a separate rigid housing. An overbraided shield and environmental seal may subsequently be added to provide further protection for the coupling.

18 Claims, 2 Drawing Sheets

UNCASED DATA BUS COUPLER

This application is a continuation of application Ser. No. 07/588,728, filed Sep. 27, 1990 is now abandoned.

BACKGROUND OF THE INVENTION

1. Field of the Invention

This invention relates to the field of electrical cable coupling and shielding, and in particular to a data bus coupling arrangement of the type including a transformer and isolation resistors for electrically coupling together three or more data buses.

2. Description of Related Art

Data bus coupling arrangements are known which permit coupling of multiple high frequency data buses via transformers and isolation elements such as resistors. An example of such a coupler is disclosed in copending U.S. patent application Ser. No. 482,707, filed Feb. 21, 1990. This application describes a data bus coupler which includes a rigid housing for enclosing the coupling components. The coupler housing is overbraided to provide a continuous uninterrupted shield over the entire coupler, while nevertheless reducing its size in comparison with couplers having a rigid or solid shield.

Despite the advantages of the overbraided data bus coupler, it would in many instances be desirable to provide an even more compact coupling arrangement, while still providing complete protection from electromagnetic interference and environmental degradation.

Conventionally, the data bus cables are themselves each shielded by a metallic outer braid, providing excellent protection from interference. The problem to be overcome is that, at the point where the individual conductors are attached to the conventional coupler, shielding discontinuities may be present. The smaller the coupler, the more difficult it is to control such discontinuities.

Prior to the overbraided coupler, in order to overcome the problem of shielding discontinuities at data bus coupler terminations, and at cable joints in general, rigid metallic casings were provided as part of, or for enclosing, the coupler housings. The shielding casings were soldered or otherwise electrically connected to the cable braids and provided a measure of shielding continuity. However, such casings suffered the disadvantages of relatively high cost and large size.

In the overbraided data bus coupler, size is reduced by providing a flexible braid over the rigid data bus coupler housing. The housing, however, is retained to protect the delicate coupling components from physical damage. While clearly an improvement over prior art arrangements, further size reductions in the size of the overbraided coupler were limited by the need to provide a housing for the coupling.

As will become apparent from the following description of the invention, a rigid coupler housing is not necessary, and coupler size can be reduced without sacrificing protection of the coupler components from physical shocks, environmental degradation, or electromagnetic interference.

SUMMARY OF THE INVENTION

It is an objective of the invention to overcome the drawbacks of the prior art by providing a cable coupling which does not require a rigid housing, and which is nevertheless capable of being effectively protected against physical shocks, environmental degradation, and electromagnetic leakage.

It is a further objective of the invention to provide such an uncased cable coupling for high frequency data buses.

It is a still further objective of the invention to provide a method of manufacturing an uncased cable or data bus coupling.

These objects are accomplished according to a preferred embodiment of the invention by providing a data bus coupling arrangement in which individual wires of a data bus are directly wired to a transformer and corresponding isolation resistors, without an intervening terminal arrangement. Support for the coupling is provided by a heat shrinkable, or otherwise mechanically shrinkable, flexible tubing which is filled with an encapsulant to provide structural support, vibration and shock dampening, and electrical isolation of all components.

Both overbraiding and an environmental seal are subsequently also included, according to the preferred embodiment, for the purpose of preventing EMI leakage and providing protection from such environmental contaminants as dust and moisture.

DETAILED DESCRIPTION OF THE PREFERRED EMBODIMENT

Figure 1:
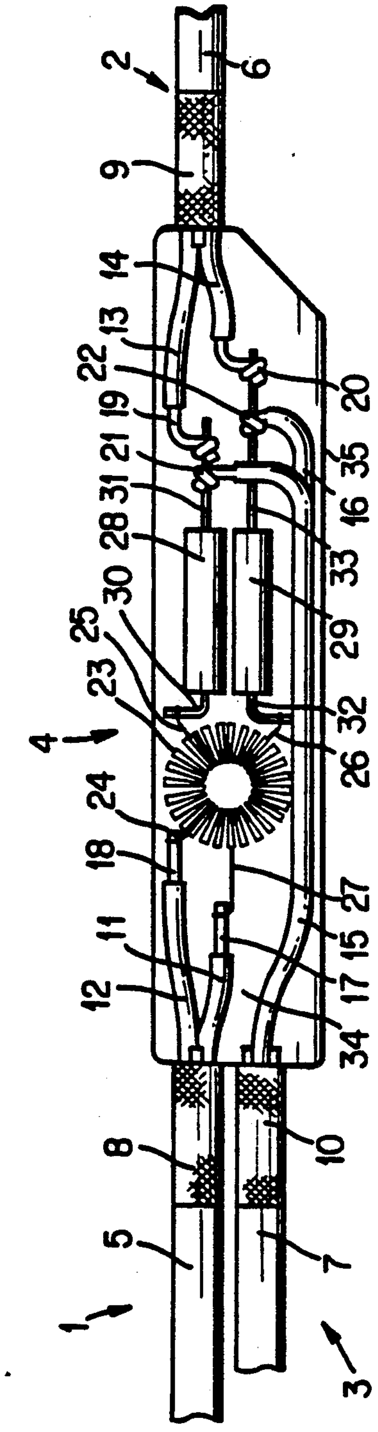
FIG. 1 is a cross-sectional side view of an uncased data bus coupling arrangement according to a preferred embodiment of the invention.

FIG. 1 is a cross-sectional side view of an uncased data bus coupler 4 constructed in accordance with the principles of a preferred embodiment of the invention for electrically coupling three shielded data bus cables 1, 2, and 3. Each of the shielded cables includes a respective jacket 5–7, enclosing respective braided shields 8–10. Each cable carries two insulated stranded or solid wires (17 and 18, 19 and 20, and 21 and 22, respectively) each of which is surrounded by individual wire insulators 11–16.

Although three cables are illustrated, it will be appreciated that the principles of the invention could also be applied to a coupling arrangement for a number of cables other than three, and that the cables could carry any number of wires. The principles of the invention are equally applicable to any of the numerous data bus configurations known to those skilled in the art, and to a variety of other cable configurations including coaxial and triaxial cables.

Figure 2:
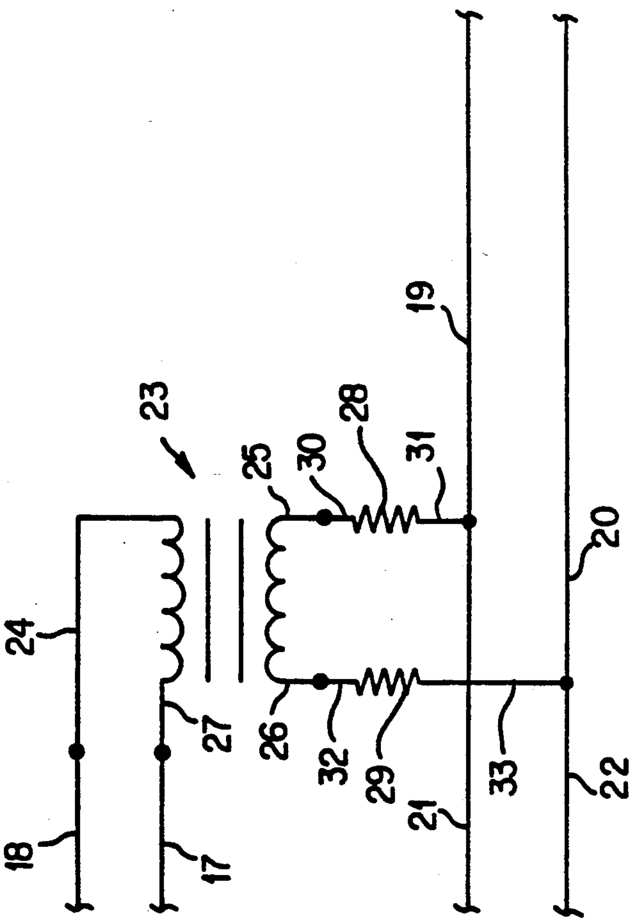
FIG. 2 is a circuit diagram of the coupling arrangement of FIG. 1.

In the preferred embodiment, the respective wires of cables 1, 2, and 3 are coupled through a toroidal transformer 23 and resistor 28 and 29 as follows: wires 17 and 18 from cable 1 are individually joined to ends 24 and 27 on individual windings of the transformer. The other ends 25 and 26 of the two windings of the transformer are joined to leads 30 and 32 of isolation resistors 28 and 29. Leads 31 and 33 of the two resistors are respectively coupled to wires 21 and 22 of cable 3 and 19 and 20 of cable 2, resulting in the circuit arrangement shown in FIG. 2. The values of the two resistors and the number of coils on the transformer are of course dependent upon the specific type of cables or data buses used. In addition, other circuit elements may be added in place of or in addition to the transformer and resistors to effect an electrical coupling, and the type of transformer may be varied as required.

The respective wires of cables 1, 2 and 3 may be attached to the leads of the transformer and resistors by any known method of electrical connection, although the well-known technique of wrapping followed by soldering is currently preferred. As indicated in FIG. 1, the braids 8–10 are removed from the ends of the wires, and jackets 5–6 are removed a predetermined distance from the ends of the braid.

The ends of each of the wires, including a portion of jackets 11–16, and the electrical components 23, 28, and 29, are all encapsulated by a suitable electrically insulating material 34 such as silicone RTV which is supplied in liquid form and solidifies upon curing. The RTV encapsulant 34 provides structural support, vibration and shock damping, and electrical isolation of all components. It will be appreciated, however, that other encapsulants having similar properties may be substituted for the RTV. Also, it is noted that for best shock protection, the cured encapsulant should retain a degree of flexibility.

Surrounding the RTV is a shrinkable or "dimensionally recoverable" tubing 35 which encases the RTV prior to curing and provides electrical isolation. In the preferred embodiment, the tubing 35 is made of a heat shrinkable material. Numerous suitable heat shrinkable materials are known to those skilled in the art, for example crystalline polymers such as polyolefins, including polyethylene, ethylene-vinyl acetate copolymer, ethylene-ethyl acrylate copolymer or other ethylene copolymers, polyvinylide difluoride, polyvinyl chloride, etc., whether cross-linked or inherently heat-recoverable. Other examples include thermoplastic elastomers such as thermoplastic polyurethanes and silicone-styrene block copolymers.

Tubing 35 shrinks and becomes rigid upon application of heat, providing support for the encapsulant as it cures, while at the same time providing an inwardly directed pressure against the encapsulant which causes the encapsulant to completely fill all voids between the components. Because the encapsulant must remain fluid during shrinkage of the tubing, it is important for the respective shrinking and curing temperatures to be selected accordingly.

Figure 3:
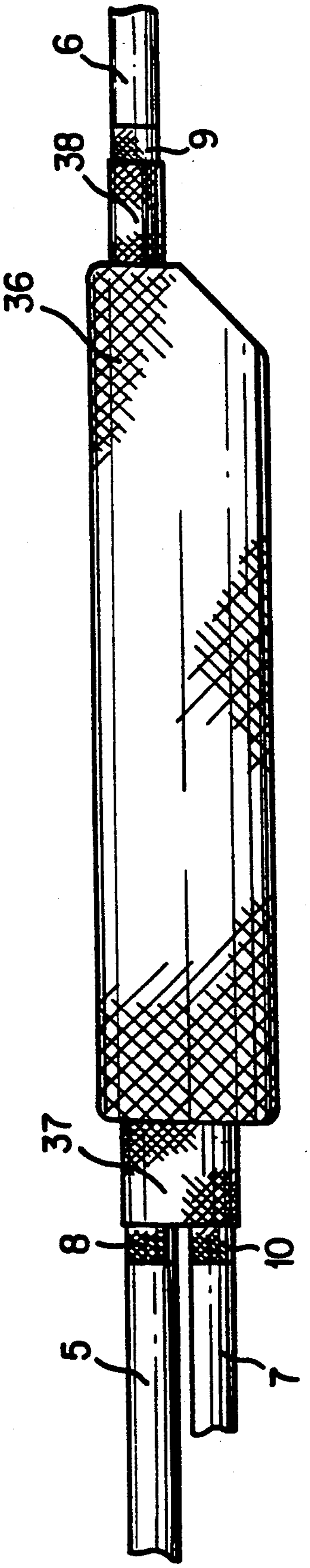
FIG. 3 is a cross-sectional side view of the coupling arrangement of FIG. 1, with the addition of an overbraided shield.

In order to provide continuous shielding against electromagnetic interference, each of the individual shields 8–10 of cables 1–3 are electrically connected together by an overbraided shield 36, best shown in FIG. 3, which completely encloses the uncased coupling.

In order to facilitate assembly, overbraid 36 may be formed in two or more parts and joined by one or more seams. The overbraid is woven from electrically conductive wires in the same known manner as the individual braids of the cables, and may include narrower sections 37 and 38 to fit closely around the individual cables.

The overbraid 36 may be electrically connected to the three respective cable shields by any of a variety of suitable electrical connection or bonding methods, including soldering or weaving the ends of the overbraid into the braided shields of the cable. Numerous other electrical connection methods will also occur to those skilled in the art.

By providing an overbraid instead of a rigid metal shield, assembly is greatly simplified due to ease of manipulating the braiding and the greater dimensional tolerances involved. However, it will be noted that the overbraid may be replaced by substituting various other flexible or easily manipulated conductive materials such as, but not limited to, pressed-over metal, metal foil wrap, and vapor deposited conductive materials.

Figure 4:
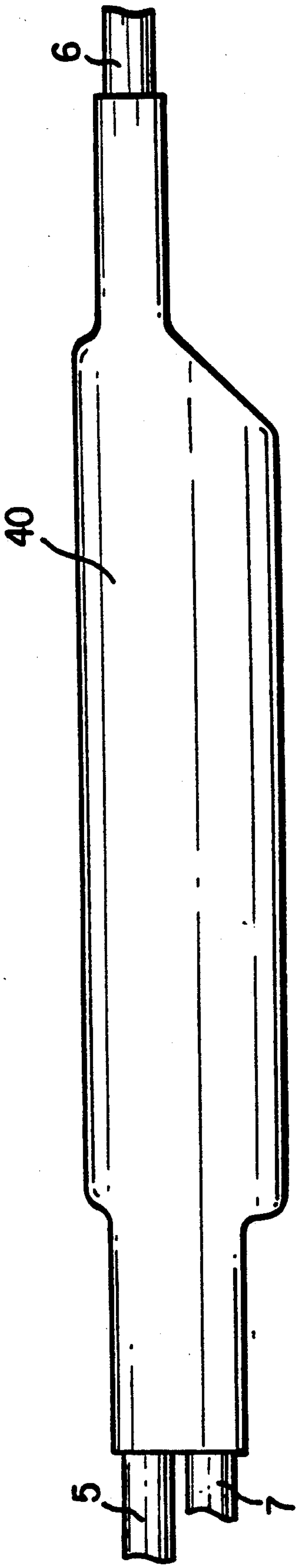
FIG. 4 is a cross-sectional side view of the overbraided coupling arrangement of FIG. 3, with the addition of an environmental seal.

As shown in FIG. 4, an environmental seal 40 encloses the overbraid 36 and the stripped back portions of the cable shields, ending at cable jackets 5–7. Bond seals are preferably added between the outer seal 40 and jackets 5–7 in order to further protect the EMI shielded assembly from moisture, dust, and other environmental contaminants. Outer seal 40 may be applied by any of a variety of known methods, including plasticoat dipping, conformal coating, overmolding, wrapping, seam welding, and so forth.

The uncased data bus coupler is preferably assembled according to the following method steps:

First, the individual cables are stripped to expose the pairs of wires therein and the braided shield. The individual insulators of the respective wires are also stripped and the exposed bare wires or strands of wires are directly connected to the transformer and respective resistors by any suitable method such as soldering, after which a shrinkable tubing material sueh as heat shrink tubing is positioned over the coupling.

The heat shrink tubing is selected to shrink to a suitable shape upon application of heat. Before heat is applied to the heat shrink tubing, RTV or a similar encapsulant is injected into the tubing, after which the heat is applied. The tubing then shrinks to an appropriate shape causing the encapsulant to fill all of the voids within the tubing. Upon curing, the encapsulant becomes solid to provide a solid structural support for the various components.

After the encapsulant has cured, the coupling may be overbraided by adding an overbraid as described above, followed by addition of the environmental seal to complete the coupling arrangement.

As indicated above, it will be recognized by those skilled in the art that the foregoing description of the invention is not intended to be limited to the precise form disclosed, and that other modifications and variations will be possible in light of the above teachings. It is therefore intended that the appended claims be construed to include all alternative embodiments and modifications of the invention except insofar as they are limited by the prior art.

We claim:

1. An uncased cable coupling arrangement for electrically coupling at least two cables, comprising:

at least two cables each including at least two wires coupled via at least one electrical component;

a member of shrinkable material enclosing said at least one component and ends of said wires, said ends of said wires being electrically connected to said component; and an encapsulant surrounding said component and said ends of said wires and enclosed within said shrinkable material.

2. An arrangement as claimed in claim 1, said cables each including a braided shield surrounding said wires and stripped back from said wires at said ends of said wires, said shrinkable material enclosing the stripped portion of said cables.

3. An arrangement as claimed in claim 1, wherein said cables are data buses and the number of said data buses is three.

4. An arrangement as claimed in claim 1, wherein said encapsulant material is RTV.

5. An arrangement as claimed in claim 1, wherein said shrinkable material is heat shrinkable tubing.

6. A method of assembling a data bus coupling, comprising the steps of:
 (a) providing at least two cables, each including individual wires enclosed by shielding material;
 (b) electrically connecting the wires together via at least one electrical component;
 (c) enclosing the ends of the individual wires and said component within a shrinkable tubing material;
 (d) filling the tubing material with a liquid encapsulant;
 (e) shrinking the tubing material to cause the encapsulant to completely fill all voids within the tubing material; and
 (f) curing the encapsulant to provide structural support, vibration and shock dampening, and electrical isolation of said at least one component.

7. A method as claimed in claim 6, wherein step (e) comprises the step of heat shrinking the tubing material.

8. An uncased cable coupling arrangement for electrically coupling at least two cables, comprising:
 at least two cables each including at least two wires coupled via at least one electrical component;
 a member of shrinkable material enclosing said at least one component and ends of said wires, said ends of said wires being electrically connected to said component; and
 an encapsulant surrounding said component and said ends of said wires and enclosed within said shrinkable material, wherein said component is a transformer.

9. An arrangement as claimed in claim 8, wherein said transformer is a toroidal transformer.

10. An uncased cable coupling arrangement for electrically coupling at least two cables, comprising:
 at least two cables each including at least two wires coupled via at least one electrical component;
 a member of shrinkable material enclosing said at least one component and ends of said wires, said ends of said wires being electrically connected to said component; and
 an encapsulant surrounding said component and said ends of said wires and enclosed within said shrinkable material, wherein said component is a resistor.

11. An arrangement as claimed in claim 10, further comprising a transformer connected between at least one of said wires and said resistor.

12. Apparatus including a cable coupling arrangement for electrically coupling at least two cables, comprising:
 at least two cables each including at least two wires coupled via at least one electrical component;
 a member of shrinkable material enclosing said at least one component and ends of said wires, said ends of said wires being electrically connected to said component;
 an encapsulant surrounding said component and said ends of said wires and enclosed within said shrinkable material; and
 a conductive shield continuation enclosing said coupling arrangement and electrically connected to each braided shield of said cables to provide a continuous uninterrupted EMI shield over the entire coupler.

13. Apparatus as claimed in claim 12, wherein said conductive shield continuation is an overbraided shield.

14. Apparatus as claimed in claim 13, wherein each of said cables includes an insulating outer jacket which covers respective braided shields of said cables, and wherein said insulating outer jacket at an end of each of said cables is stripped to expose a respective braided shield and thereby permit connection between said respective braided shield and said overbraided shield.

15. Apparatus as claimed in claim 14, wherein each of said cables includes an insulating outer jacket and said arrangement further comprises an environmental seal enveloping said overbraided shield and boned to each of said insulating outer jackets.

16. A method of assembling a data bus coupling, comprising the steps of:
 (a) providing at least two cables, each including individual wires enclosed by shielding material;
 (b) electrically connecting the wires together via a transformer by directly connecting the wires to the transformer and to at least one resistor;
 (c) enclosing the ends of the individual wires and said component within a shrinkable tubing material;
 (d) filling the tubing material with a liquid encapsulant;
 (e) shrinking the tubing material to cause the encapsulant to completely fill all voids within the tubing material; and
 (f) curing the encapsulant to provide structural support, vibration and shock dampening, and electrical isolation of said at least one component.

17. A method of assembling a data bus coupling, comprising the steps of:
 (a) providing at least two cables, each including individual wires enclosed by shielding material;
 (b) electrically connecting the wires together via at least one electrical component;
 (c) enclosing the ends of the individual wires and said component within a shrinkable tubing material;
 (d) filling the tubing material with a liquid encapsulant;
 (e) shrinking the tubing material to cause the encapsulant to completely fill all voids within the tubing material;
 (f) curing the encapsulant to provide structural support, vibration and shock dampening, and electrical isolation of said at least one component; and
 (g) overbraiding the coupling after curing the encapsulant.

18. A method as claimed in claim 17, further comprising the step of adding an environmental seal after overbraiding the coupling.

* * * * *